(12) United States Patent
Lorgouilloux et al.

(10) Patent No.: US 9,365,696 B2
(45) Date of Patent: Jun. 14, 2016

(54) FLAME-RETARDANT MINERAL FILLERS AND FLAME-RETARDANT POLYMER COMPOSITIONS

(71) Applicant: S. A. Lhoist Recherche et Developpement, Ottignies-Louvain-la-Neuve (BE)

(72) Inventors: Marion Lorgouilloux, Strepy Bracquegnies (BE); Didier Lesueur, Braine-le-Chateau (BE); Thierry Chopin, Uccle (BE); Fouad Laoutid, Lambersart (FR); Philippe Dubois, Braives (BE)

(73) Assignee: S.A. LHOIST RECHERCHE et DEVELOPPEMENT, Ottignies-Louvain-la (BE)

( * ) Notice: Subject to any disclaimer, the term of this patent is extended or adjusted under 35 U.S.C. 154(b) by 0 days.

(21) Appl. No.: 14/406,972

(22) PCT Filed: Jul. 12, 2013

(86) PCT No.: PCT/EP2013/064764
§ 371 (c)(1),
(2) Date: Dec. 10, 2014

(87) PCT Pub. No.: WO2014/009510
PCT Pub. Date: Jan. 16, 2014

(65) Prior Publication Data
US 2015/0158992 A1    Jun. 11, 2015

Related U.S. Application Data

(60) Provisional application No. 61/696,958, filed on Sep. 5, 2012.

(30) Foreign Application Priority Data

Jul. 12, 2012 (BE) .................................. 2012/00487

(51) Int. Cl.
*C01F 5/16* (2006.01)
*C08K 5/09* (2006.01)
*C09K 21/02* (2006.01)
*C08K 3/00* (2006.01)
*C08K 3/22* (2006.01)
*C08K 3/26* (2006.01)

(52) U.S. Cl.
CPC ................. *C08K 5/09* (2013.01); *C08K 3/0058* (2013.01); *C08K 3/22* (2013.01); *C08K 3/26* (2013.01); *C09K 21/02* (2013.01); *C01F 5/16* (2013.01); *C08K 2003/222* (2013.01); *C08K 2003/2206* (2013.01); *C08K 2003/2224* (2013.01); *C08K 2003/265* (2013.01)

(58) Field of Classification Search
CPC .............. C01F 5/16; C08K 2003/2217; C08K 2003/2206
USPC ......................................................... 423/164
See application file for complete search history.

(56) References Cited

U.S. PATENT DOCUMENTS

| | | | |
|---|---|---|---|
| 2005/0113500 A1 | 5/2005 | Okoshi et al. | |
| 2006/0188428 A1 | 8/2006 | Wakabayashi et al. | |
| 2010/0329971 A1* | 12/2010 | Yamamoto | A61K 33/08 423/579 |
| 2015/0044469 A1* | 2/2015 | Lorgouilloux | C01F 5/24 428/402 |

FOREIGN PATENT DOCUMENTS

| | | |
|---|---|---|
| DE | 102009034700 A1 | 4/2010 |
| EP | 1896364 A2 | 3/2008 |

OTHER PUBLICATIONS

PCT/2013/064764 International Search Report, Oct. 10, 2013, 3 pages, European Patent Office.

* cited by examiner

*Primary Examiner* — Margaret Moore
(74) *Attorney, Agent, or Firm* — Whitaker Chalk Swindle & Schwartz PLLC; Charles D. Gunter, Jr.

(57) ABSTRACT

A powdery mineral filler comprising a calcium compound and a magnesium compound, comprising a semi-hydrated dolomite of general formula $aCaCO_3 \cdot bCa(OH)_2 \cdot cMg(OH)_2 \cdot dMgO \cdot eCaO$, a, b, c, d and e being molar fractions with $(a+b+e)/(c+d)$ between 0.8 and 1.2, and comprising particle agglomerates, a flame-retardant polymer composition containing same, production methods and use of such mineral fillers.

22 Claims, 6 Drawing Sheets

FLAME-RETARDANT MINERAL FILLERS AND FLAME-RETARDANT POLYMER COMPOSITIONS

The present invention relates to the field of flame-retardant polymer compositions and therefore to flame-retardant or flame-retarding mineral fillers to be added to polymers as a flame-retardant additive comprising a calcium compound and a magnesium compound.

Flame-retardant additives or fire-retardant or further fire-retarding additives are incorporated into polymer matrices in order to slow down or stop combustion of the polymer in the case of a fire. A distinction is made inter alia from two categories of effects of these flame-retardant additives (called fillers in the following text), i.e. chemical effects and physical effects.

From among the chemical effects, acceleration of the breaking of the chains of the polymer under the effect of temperature is found which leads to a molten polymer which will drip and leave the hot area of the fire. In the case of systems based on phosphorus-containing flame-retardants, the formation of a charring layer is found by reaction between the filler and the polymer; this layer is then used as a barrier and prevents the evolvement of combustible gases which feed the fire. Also, fillers are again found which, during the rise in temperature, release non-flammable compounds or which trap free radicals present in the gaseous phase. Some of these chemical effects are obtained by using halogenated fillers (bromides and chlorides) which are gradually abandoned for toxicological and environmental reasons.

Among the physical effects, the reaction of endothermic decomposition of the filler is found which causes cooling of the polymer and release of inert gases like steam or $CO_2$ which will then act as diluents for oxidizing and combustible gases. Finally, the formation of a protective layer is also found from the degradation of the filler, a layer which will again prevent the release of combustible gases. These physical effects are generally obtained with mineral fillers.

Generally, the compositions comprising mineral fillers on the one hand and polymers on the other hand should have certain features so as to be practically applicable. First of all, the flame-retardant effect should be able to be quantified in order to evaluate the benefit of such compositions. The standardized method of the cone calorimeter (ISO 5660-1 or ASTM E 1354) is used for determining the evolvement of heat (noted as HRR for Heat Rate Release and expressed in $kW/m^2$) from a polymer composition optionally containing mineral fillers, when the latter is exposed to a controlled level of radiant heat. This method, called hereafter <<a fire test>>, further allows determination of the flammability, the mass loss, the production of fumes, or further, the combustion heat of a composition. For a filled polymer, a not very large amount of heat expresses a good flame-retardant effect of the mineral fillers.

There exist other methods for evaluating the flame-retardant effect. The LOI (Limiting Oxygen Index) is used for illustrating relative flammability of the materials, according to the standard (ASTM D 2863), and corresponds to the limiting oxygen level (in a $O_2$—$N_2$ mixture) below which the combustion, duly initiated, does not propagate and beyond which it propagates. As the oxygen level is 21% in the atmosphere, the materials having a LOI of less than 21 will be classified as <<combustible>> while materials for which the LOI is greater than 21 will be classified as <<self-extinguishing>>, their combustion cannot propagate without an external energy supply.

The so-called "epiradiator" test (NF P92-505) consists of subjecting a plate with dimensions 70 mm×70 mm×4 mm to constant heat radiation (500 W) and of possibly causing inflammation of the evolved gases. As soon as the plate catches fire, the radiator is moved away after 3 seconds, and then put back in its initial position when the specimen is extinguished. This operation is renewed for a minimum period of 5 mins. This test gives the possibility of quantifying the resistance to inflammation of a material (ignition time) and its self-extinguishability (number of ignitions).

There exist still other methods which generally correspond to specific applications of filled polymers (cables, electric equipment, electric accessories . . . ) among which the inflammation test UL94, the various methods of the so-called <<incandescent wire>> test (IEC 60695-2), the cone calorimeter adapted to cables (EN 50399) . . . .

Moreover, given the high proportion of these mineral fillers in the compositions, it is important to evaluate the impact that mineral fillers will have on the mechanical properties of polymeric compositions. Consequently, the filled polymers should have acceptable mechanical strength (traction, impact) characteristics.

These mechanical strength characteristics are notably evaluated with tensile tests, for example according to the ASTM D638 or ISO 527-1 standard with an elongation rate of 50 mm/min. This method allows determination of the elongation at break in percents. Moreover, impact resistance is quantified according to the ISO EN 179-2 standard which determines resilience in $kJ/m^2$.

The most common mineral fillers to be used with polymers in order to obtain a flame-retardant effect are mainly aluminium trihydroxide $Al(OH)_3$, also called ATH and magnesium dihydroxide $Mg(OH)_2$, also called MDH.

Aluminium trihydroxide represents a major part of the present market for flame-retardant additives. Its degradation temperature is of the order of 220° C. This endothermic degradation consumes 150 kJ/kg and leads to the formation of a protective aluminium oxide $Al_2O_3$ layer.

As the decomposition temperature of ATH is low as compared with that of other mineral fillers, aluminium trihydroxide is only suitable for polymers also having low shaping temperatures. Also, low temperature compounding techniques have to be used (Buss extruder typically). Unfortunately, in order to have an effective flame-retardant effect, ATH has to be added to the polymer matrix in an amount of 50-75% by weight of the composition comprising the polymer and the filler, which causes strong degradation of the mechanical properties of the non-filled polymer.

At the present time, the main non-halogenated alternative to ATH is MDH. This mineral hydroxide ($Mg(OH)_2$) is decomposed at a higher temperature than ATH. This allows it to be used in a larger selection of polymers and with more economical shaping equipment (twin-screw extruder typically). MDH represents much smaller market shares as compared with those of ATH. However, there has been a rising interest in it, these recent years. The degradation temperature of magnesium dihydroxide is about 330° C. and this endothermic degradation consumes 1300 kJ/kg. Degradation of MDH produces MgO which forms a protective layer up to a high temperature.

Again, like for ATH, the MDH content is generally comprised between 50 and 75% by weight of the composition comprising the polymer and the filler, which degrades the mechanical properties of this composition as compared with those of the non-filled polymer. Further the synthesis route of such a hydroxide is complicated making this mineral filler rather prohibitive.

Calcium dihydroxide $Ca(OH)_2$, often obtained by hydration (slaking) of quicklime, is decomposed in an endothermic way (consumption of 900 kJ/kg) around 400° C., releasing water and giving rise to the formation of an oxide, CaO. $Ca(OH)_2$ consequently appears as a mineral hydroxide having all the required properties for being used as a flame-retardant filler. However, the decomposition temperature of $Ca(OH)_2$ is high as compared with those of ATH and of MDH, and $Ca(OH)_2$ is therefore efficient as a flame-retardant only at a relatively high temperature, the risk being that at this temperature, the polymer is already totally degraded. Moreover, because of its strong basicity (pH greater than 12), $Ca(OH)_2$ may be used as a filler only in polymeric matrices for which properties are not degraded in contact with particles of high pH. $Ca(OH)_2$ is consequently less common than ATH and MDH.

Also, the use as a flame-retardant of compounds of general formula $Ca(OH)_2.Mg(OH)_2$ is known from the state of the art.

For example, document U.S. Pat. No. 5,422,092 describes a more effective flame-retardant filler than magnesium hydroxide (which allows the use of lesser amounts), and also less expensive (which allows limitation of the polymer production costs). The filler according to this teaching is a composite metal hydroxide of the solid solution type and of general formula $Ca_{1-x}M^{2+}_x(OH)_2$ wherein M is at least one of the metals Mg, Mn, Fe, Co, Ni, Cu, and Zn and wherein x is comprised between 0.001 and 0.995.

Document EP 0 541 329 is very similar to U.S. Pat. No. 5,422,092 described above; but the obtained solid solution is a composite metal hydroxide of formula $Ca_{1-x}M^{2+}_x(OH)_2$ wherein M is at least one divalent metal from Mg, Mn, Fe, Co, Ni, Cu, and Zn and wherein x is comprised between 0.005 and 0.400.

Document FR 2574083 describes a powdery filler for plastic materials, notably for polyolefins, based on dolomites or dolomite limestones, of composition: $xMg(OH)_2.yCa(OH)_2.zCaCO_3$, all the MgO having been hydrated under pressure. This is therefore a semi-calcined dolomite and totally hydrated. The $CaCO_3$ an $Ca(OH)_2$ contents are highly variable and depend on the degree of calcination of the dolomite.

Patent DE102009034700, as for it, describes the obtaining by methods described as simple and economical, of compositions based on calcium and/or magnesium from natural products based on calcium and/or magnesium. These compositions are submicron or even nanometric compositions (primary particles <300 nm, or even <200 nm, or even <100 nm). The synthesis of such submicron particles or even nanometric particles implies resorting to calcination conditions suitable for natural products (temperature and calcination duration). Moreover, in the particular case of hydrated dolomite particles, the hydration of the oxide particles obtained by calcination of natural products under the aforementioned particular conditions has to be achieved under pressure in order to guarantee a satisfactory residual MgO content (<10% by mass).

Document US 20060188428 describes an additive for plastics obtained by calcination and then hydration of a dolomite and mainly consisting of calcium carbonate ($CaCO_3$), magnesium carbonate ($MgCO_3$), magnesium oxide (MgO), calcium hydroxide ($Ca(OH)_2$) and magnesium hydroxide ($Mg(OH)_2$). This additive is used for its antimicrobial properties and for its capability of capturing hydrochloric acid which is released during the combustion of composition based on polyvinyl chloride (PVC). In this additive, the magnesium oxide proportion is always less than that of magnesium hydroxide.

The possibility of combining the use of $Mg(OH)_2$ and of $Ca(OH)_2$ as flame-retardant fillers in a polymer matrix appears that it has a certain number of advantages. Indeed, the $Mg(OH)_2$ component of such a formulation would play its role of a flame-retardant around 300° C., giving rise to the formation of a charring layer, a well known phenomenon in the case of the use of $Mg(OH)_2$ alone (MDH), and would gradually lead to the formation of a protective MgO layer. In parallel, the component $Ca(OH)_2$ would begin to decompose around 400° C., playing a second flame-retardant role. Unlike ATH, this combination should be able to be used in a large number of polymer matrices because of the high decomposition temperatures of $Mg(OH)_2$ and of $Ca(OH)_2$, with equipment traditionally used for extruding polymer parts filled with MDH, and would have a flame-retarding effect on a wider temperature range as that simply covered by MDH.

The object of the present invention is therefore to propose mineral fillers comprising a calcium compound and a magnesium compound allowing improvement in the fire resistance of polymer compositions according to standard mechanisms of flame retardants of the metal hydroxide type such as ATH and MDH, while retaining or imparting acceptable mechanical characteristics for the polymer composition containing the mineral filler. Ideally, this mineral filler should further allow the obtaining of a combustion residue which may form an advantageous fire resistant barrier.

For this purpose, the invention therefore provides a powdery mineral filler which is flame retardant or flame-retarding, comprising a calcium compound and a magnesium compound which is characterised in that said mineral filler comprises a semi-hydrated dolomite fitting the general formula $aCaCO_3.bCa(OH)_2.cMg(OH)_2.dMgO.eCaO$, a, b, c, d and e being molar fractions with $(a+b+e)/(c+d)$ being comprised between 0.8 and 1.2 and having values such that b represents the molar fraction corresponding to a weight proportion ≥15%, c represents the molar fraction corresponding to a weight proportion ≥1%, d represents the molar fraction corresponding to a weight proportion ≥1%, a and e respectively representing molar fractions corresponding to weight proportions both being ≥0%, said weight proportions being given based on the total weight of said semi-hydrated dolomite, and in that said mineral filler comprises agglomerates of particle aggregates.

By the term of "particles" in the sense of the present invention, is meant the smallest solid discontinuity of the mineral filler which may be observed with a scanning electron microscope (SEM).

By the term of "particle aggregates" is meant in the present invention a cohesive assembly of particles.

By the term of "particle agglomerates" is meant in the sense of the present invention a loose assembly of aggregates of particles and/or of particles, which may easily be destroyed by mechanical means (ultrasound, stirring, shearing, vibration . . . ).

As may be seen, the present invention describes the use not of physical mixtures but actually of a single compound providing both $Mg(OH)_2$, $Ca(OH)_2$ and MgO. This compound is a dolomite derivative, also called a semi-hydrated dolomite, obtained by calcination and then by partial hydration (slaking with water) of a natural dolomite. The use of a single compound instead of physical mixtures of two compounds has a considerable advantage practically, since the method for extruding a filled polymer will be easier when a single filler is used instead of two, for example reducing the number of powder metering devices on the extrusion line. Further, the homogeneity of the $Ca(OH)_2$ and $Mg(OH)_2$ dispersion in the polymer matrix is also improved when both of these components are provided via a single filler, itself perfectly homogenous.

The mineral filler according to present invention, of general formula $aCaCO_3.bCa(OH)_2.cMg(OH)_2.dMgO.eCaO$ therefore has the advantage on the one hand as compared with a physical mixture of providing a $Ca(OH)_2$ component and an $Mg(OH)_2$ component closely bound together, therefore allowing a perfectly homogenous incorporation into a flame retardant polymer composition. On the other hand, it has the advantage as compared with completely hydrated dolomite of being a product which is much more easy to obtain. Indeed, totally hydrated dolomite, which may be represented by a molar formula of the type $xCaCO_3.yCa(OH)_2.zMg(OH)_2$ and containing non-hydrated residues CaO and/or MgO only in trace amounts (less than 1%), often expressed in a simplified way by a formula $yCa(OH)_2.zMg(OH)_2$, is difficult to obtain, since it requires complete hydration of calcinated dolomite, generally carried out under pressure. The totally hydrated dolomite of general formula $xCaCO_3.yCa(OH)_2.zMg(OH)_2$ therefore remains at the present time a specialty product.

The mineral filler according to the present invention is a comparable product, this time assimilated to a convenience product. This is the semi-hydrated dolomite for which hydration is controlled and easy to apply, which makes it a product much less expensive than totally hydrated dolomite. According to the properties of the natural dolomite source and the controlled operating conditions of calcination and hydration of this dolomite, the semi-hydrated dolomite may have a variable hydration level of MgO in $Mg(OH)_2$, as well as a variable grain size and chemical composition.

It is by controlling these parameters allowing synthesis of semi-hydrated dolomite, according to the invention a particularly advantageous mineral filler was shown as a flame retardant mineral filler when it is added to a polymer composition in order to obtain a flame-retardant polymer composition. These flame-retardant compositions comprising the mineral filler according to the invention have a non-negligible advantage as compared with compositions based on ATH or MDH in that the collected combustion residue at the end of the combustion of the polymer is cohesive and may even be described as ceramised so that the flame-retardant compound is also fire resistant. Indeed, during the decomposition of the polymer matrix, strong concentrations of $CO_2$ are released into the atmosphere of the combustion area. This $CO_2$ will react with the $Ca(OH)_2$ initially present in the filler of the composition according to the invention or with the CaO lime stemming from partial degradation of the $Ca(OH)_2$ in order to form calcium carbonate of formula $CaCO_3$. This $CaCO_3$ is a cohesive solid which does not collapse in the form of ashes as is the case of the residue obtained at the end of combustion for compositions based on ATH and MDH. This cohesive effect is particularly useful in the case of plastic parts used in electric or electronic fields (electric or electronic equipment, electric cables and/or communications cables . . . ); in particular for claddings of electric cables in polymers, it is preferable that during the course of a fire, the cable sheath remains around the conducting cable in order to continue to ensure operation and avoid short-circuits.

At the present time, it seems that this cohesive effect, although highly sought and appreciated, is only obtained in the presence of complex formulations containing ATH or MDH as a flame-retardant filler, associated with nanoparticles (clays, carbon nanotube, silica . . . ), zinc borate . . . as a ceramising agent. These ceramising agents are expensive, difficult to incorporate into the polymer and for a great number of them have an unfavourable ecotoxic profile which limits their use and makes it necessary to search for substitutes.

Also, the capture of $CO_2$ during the combustion displaces the combustion equilibrium towards the formation of $CO_2$ to the detriment of CO, reducing the toxicity of the fumes. This is a positive additional effect related to the use of fillers according to the invention.

When it is heated at 5° C./min in air in a thermal analysis apparatus of the thermogravimetric type, the hydrated component ($Mg(OH)_2$ and $Ca(OH)_2$) of the mineral filler according to the invention is decomposed between 250 and 600° C., in particular between 250 and 560° C., more particularly between 250 and 520° C. This decomposition occurs in two steps with first of all the decomposition of $Mg(OH)_2$ between 250 and 450° C., in particular between 250 and 420° C., more particularly between 250 and 400° C., followed by decomposition of $Ca(OH)_2$ between 450 and 600° C., in particular between 420 and 560° C., more particularly between 400 and 520° C. Another way of describing the decomposition of the filler under the same heating conditions is to use the temperature at which there remains 95% of the initial mass of the sample, 5% of this sample having already been lost by dehydroxylation. This temperature is noted as T95% and is comprised between 350 and 500° C., in particular between 400 and 460° C.

In an advantageous embodiment of the flame-retardant or flame-retarding mineral filler, said aggregates of particles have a $d_{97}<30$ µm, preferably $<20$ µm, a $d_{90}<15$ µm, preferably $<10$ µm, a $d_{50}<5$ µm, preferably $<4$ µm and a $d_3>0.3$ µm, preferably $>0.4$ µm after suspension in methanol.

In an advantageous embodiment according to present invention, said $d_{97}$ of the aggregates of particles is $<15$ µm, preferably $<10$ µm, measured after suspension in methanol.

Preferably, said $d_{90}$ of the aggregates of particles is $<7$ µm, preferably $<5$ µm measured after suspension in methanol.

More preferentially, said $d_{50}$ of the aggregates of particles is $<3$ µm measured after suspension in methanol.

In an advantageous embodiment of the flame-retardant or flame-retarding mineral filler, said agglomerates of aggregates of particles have a $d_{97}<150$ µm, preferably $<100$ µm, a $d_{90}$ of $<30$ µm, preferably $<20$ µm, a $d_{50}<8$ µm, preferably $<5$ µm and a $d_3>0.4$ µm, preferably $>0.5$ µm, measured after suspension in methanol.

Advantageously said $d_{97}$ of the agglomerates of particles is $<80$ µm, preferably $<50$ µm, measured after suspension in methanol.

Advantageously said $d_{90}$ of the agglomerates of particles is $<15$ µm, preferably $<10$ µm, measured after suspension in methanol.

Preferably, in the mineral filler according to present invention, said $d_{50}$ of the agglomerates of particles is $<4$ µm, measured after suspension in methanol.

The distribution of the sizes of the agglomerates or aggregates of particles and therefore the values of $d_{97}$, $d_{90}$, $d_{50}$ and $d_3$ are measured with a grain size measurement device with laser ray diffraction. The values of $d_{97}$, $d_{90}$, $d_{50}$ and $d_3$ respectively represent the diameter of the agglomerates or aggregates of particles such that 97%, 90%, 50% and 3% are respectively of a smaller size.

For the measurement of the sizes of the aggregates of particles, the mineral filler is subject beforehand to ultrasound for 1 min.

Advantageously, in the mineral filler, the molar fractions are such that the ratio $(a+b+e)/(c+d)$ is comprised in the range from 0.90 to 1.15, preferably from 0.95 to 1.10.

The calcined dolomite allowing the obtaining of this hydrated filler stems from calcination of a natural crude dolomite of formula $yCaCO_3.zMgCO_3$. It is commonly recognised that natural dolomites contain more than 90 to 95% by mass of dolomite, a mineral of formula $CaCO_3.MgCO_3$, the remainder of the composition being in most cases calcite and/or clays. Consequently, natural dolomites generally have a molar Ca/Mg ratio comprised between 0.8 and 1.2. This molar ratio remains unchanged during the steps for calcination and hydration of the dolomite.

Preferably, the mineral filler according to the invention comprises from 1 to 20% by weight, preferably less than 18% by weight, more preferentially less than 10% by weight, still more preferentially less than 8% by weight and still more preferentially less than 6% by weight of $CaCO_3$ based on the total weight of said semi-hydrated dolomite.

This $CaCO_3$ component stems from incomplete calcination of crude dolomite before hydration. Preferentially, it contains between 2 and 6% by mass of $CaCO_3$. These values are determined according to the mass loss measured between 600 and 900° C. in air or in nitrogen, which corresponds to the leaving of $CO_2$ during decarbonation of $CaCO_3$. Advantageously, the mineral filler according to present invention comprises less than 15% by weight, preferably less than 10% by weight, more preferentially less than 5% by weight, still more preferentially less than 3%, in particular less than 2% of CaO based on the total weight of said semi-hydrated dolomite. This CaO component is residual quicklime from incomplete hydration of the calcium portion of the calcinated dolomite. Preferentially, the filler according to the invention does not contain any residual CaO.

According to the invention, the dolomite is semi-hydrated and contains at least 1% by weight of MgO.

The mineral filler according to the invention contains in an advantageous embodiment, at least 5% by weight and preferably at least 10%, advantageously at least 15%, preferentially at least 20% by weight of MgO based on the total weight of said semi-hydrated dolomite and preferably comprises less than 41%, in particular less than 30% by weight of MgO based on the total weight of said semi-hydrated dolomite.

In an advantageous embodiment according to present invention, the mineral filler comprises from 2 to 51% by weight, preferably from 3 to 40% by weight, preferentially from 6 to 30% by weight, even more preferentially from 8 to 25% by weight of $Mg(OH)_2$ based on the total weight of said semi-hydrated dolomite. Advantageously, the semi-hydrated dolomite according to the invention preferably contains from 10 to 20% by weight of $Mg(OH)_2$ based on the total weight of said semi-hydrated dolomite.

In an advantageous embodiment, the molar ratio d/c is greater than 1, preferably at least greater than 2, in particular greater than 4.

When these values are combined with the values from 1 to 20% of $CaCO_3$ and from 0 to 15% of CaO mentioned earlier, they imply, always for a molar Ca/Mg ratio comprised between 0.8 and 1.2, that the mass proportion of $Ca(OH)_2$ in the filler of the composition according to this advantageous embodiment of the invention is comprised between 15 and 69%.

In another advantageous embodiment according to present invention, the mineral filler comprises from 30 to 65% by weight, advantageously from 40 to 60% by weight, preferably from 45 to 55% by weight of $Ca(OH)_2$ based on the total weight of said semi-hydrated dolomite.

Moreover, in addition to $CaCO_3$, $Ca(OH)_2$, $Mg(OH)_2$, MgO and CaO, the mineral filler of the composition according to the invention may contain impurities usually present in natural dolomites, i.e. phases derived from $SiO_2$, $Al_2O$, $Fe_2O_3$, MnO, $P_2O_5$, $K_2O$ and/or $SO_3$ but the sum of these impurities, expressed in the form of the aforementioned oxides, does not exceed 5%, preferably 3%, preferably 2% or even 1% by weight of the semi-hydrated dolomite. In particular, the filler of the composition according to the invention advantageously contains less than 1.0% by mass of $Fe_2O_3$, preferably less than 0.7% and preferably less than 0.5%, so as to not significantly modify the colour of the flame-retardant polymer composition.

More advantageously, the mineral filler according to the invention has a specific surface area, measured by nitrogen adsorption manometry and computed according to the BET method, comprised between 6 and 35 $m^2/g$, preferably between 7 and 20 $m^2/g$, more preferentially between 8 and 13 $m^2/g$.

Preferably, the mineral filler according to the invention is free of added halogens, which means that the latter are in trace amounts and that in any case at a content of less than 0.5% by weight.

Other embodiments of the mineral filler according to the invention are indicated in the appended claims.

The present invention also relates to a flame-retardant polymer composition comprising a mineral filler according to the present invention and a polymer, said mineral filler being incorporated in an amount from 1 to 80% by weight, advantageously from 40 to 75% by weight, in the flame retardant polymer composition. The polymer may be of the thermoplastic, thermosetting or elastomeric type, of natural or synthetic origin. It may for example be selected from polyethylene, polypropylene, polystyrene, ethylene and propylene copolymer (EPR), ethylene-propylenediene terpolymer (EPDM), ethylene and vinyl acetate copolymer (EVA) ethylene and methyl acrylate copolymer (EMA), ethylene and ethyl acrylate copolymer (EEA), ethylene and butyl acrylate copolymer (EBA), ethylene and octene copolymer, a polymer based on ethylene, a polymer based on polypropylene, polystyrene, a halogenated polymer, a silicone or any mixture of these compounds. Advantageously, the polymeric matrix of the polymer composition of the present invention comprises at least one polymer from the group above.

Further, the polymeric composition according to present invention may contain additives usually used in polymer compositions (antioxidants . . . ).

As regards the flame-retarding effect evaluated by the cone calorimeter method, a flame-retardant composition according to the invention comprising from 1 to 80% by weight of the flame-retardant filler according to the invention and the remainder of polymeric matrix, has a flame-retardant nature at least equivalent to that of the same polymer filled with the same amount of ATH or of MDH. By equivalent flame-retardant nature, is meant an ignition time at least as long and a maximum of the HRR of the same order of magnitude or lower. The ignition time is the time between the beginning of the heating of the sample and its ignition.

As regards the mechanical strength of the polymers filled with the filler according to the invention, the elongation at break is lower, Young's modulus is higher and the resilience is lower as compared with the values obtained for the non-filled host polymer.

Nevertheless, this detrimental effect of the mineral fillers on the mechanical resistance of the polymers is known and accepted!

Another way for describing the flame-retarding effect of the filler according to the invention is to compare the maximum of the HRR curve of the non-filled host polymer with the maximum of the HRR curve of the polymer filled with 40 to 75% by weight of the filler of the composition according to the invention. The filler of the composition according to the invention thus allows a reduction in the maximum of the HRR curve of the host polymer by 50 to 65%, preferably by 65 to 80% and preferably by 80 to 90%.

The composition according to the present invention is also used for improving the fire resistance of a formulation or of a finished or semi-finished part according to a fire resistance test (LOI, cone calorimeter, UL94 . . . ), in particular wherein the maximum of a HRR curve of said polymer is reduced by 65%, preferably by 80%.

Advantageously, the flame-retardant polymer composition according to present invention further comprises a surface agent or a coupling agent such as a silane or a fatty acid for treating the surface of said mineral filler. It may also contain in a particular embodiment, a compatibilisation agent, such as a polyethylene grafted with maleic anhydride for example.

Said semi-hydrated dolomite of the mineral filler may be surface-treated by either one of the methods notably disclosed in WYPYCH G., Handbook of fillers, $3^{rd}$ ed. 2010, Chemtec Publisher, ISBN 978-1-895198-41-6, in chapter 6 "Chemical properties of fillers and filled materials"; pp 291 and the following and summarised in Table 6.1 of this reference. In particular, this treatment is carried out by means of a surface agent or a coupling agent such as for example a silane or a fatty acid.

In an alternative according to present invention, said polymer is a thermoplastic organic polymer.

Further, said mineral filler is advantageously incorporated in an amount from 50 to 60% by weight based on the total weight of said flame-retardant polymer composition.

In the case of certain polymeric matrices, for example polyethylene, the dispersion of the filler according to the invention in the polymer matrix is made difficult by the surface charge of the mineral filler of the composition according to the invention, as this is also the case for ATH and MDH. Like for ATH and MDH, this mechanical strength of charged apolar matrices of the polyethylene type with the filler according to the invention may be improved by a surface treatment of the mineral filler by a colouring agent or a coupling agent. Filler/polymer compatibilisation techniques by a surface treatment are known, notably those resorting to fatty acids and the one resorting to silanes. In the case of certain other polymeric matrices, for example EVA, the filler according to the invention may be used as such without any surface treatment, while allowing the composition to attain mechanical properties of the same order of magnitude as those of similar compositions based on ATH or MDH.

Other embodiments of the flame-retardant polymer composition according to the invention are indicated in the appended claims.

The present invention also relates to a method for manufacturing a mineral filler according to the present invention.

Methods for manufacturing mineral fillers are known from the state of the art.

For example, document U.S. Pat. No. 5,422,092 describes a filler based on a composite metal hydroxide of the solid solution type and of general formula $Ca_{1-x}M^{2+}_x(OH)_2$ wherein M is at least one of the metals Mg, Mn, Fe, Co, Ni, Cu and Zn and wherein x is comprised between 0.001 and 0.995. These composite fillers may be obtained by co-precipitation by adding a base to a solution containing $Ca^{2+}$ and $M^{2+}$ ions, by hydration of a solid solution of CaO and of MO, by reaction between a suspension of $Ca(OH)_2$ and an aqueous solution containing $M^{2+}$ ions or further via a sol-gel route. The obtained products are subject in every case to a 1 h post-synthesis hydrothermal treatment in an autoclave at 110-250° C. with the purpose of promoting crystalline growth and preventing aggregation.

Document EP 0 541 329 is very similar to document U.S. Pat. No. 5,422,092 described above, but only discloses two methods for making this solid solution. This is either a reaction between the base and a solution containing $Ca^{2+}$ and $M^{2+}$ ions, or a reaction between a suspension of CaO or $Ca(OH)_2$ and an aqueous solution containing $M^{2+}$ ions.

The production from dolomite of totally hydrated fillers of general formula $xCaCO_3.yCa(OH)_2.zMg(OH)_2$ containing CaO and/or MgO which are not hydrated, only in trace amounts (less than 1% by weight), or of a simplified formula $yCa(OH)_2.zMg(OH)_2$, with a y/z, the molar ratio comprised between 0.8 and 1.2 is also known. This production is however particularly complicated. Indeed, once it is calcined into CaO.MgO, the dolomite has to be hydrated. Now, the component MgO of the calcined dolomites is difficult to totally hydrate. Indeed, this MgO component stems from decarbonation of $MgCO_3$ from the initial dolomite. This decomposition generally occurs between 600 and 800° C. The $CaCO_3$ fraction of natural dolomite only decarbonating beyond 800° C., obtaining calcined dolomite CaO.MgO necessarily requires heating of the crude dolomite around 900° C. or more, i.e. well beyond the decomposition temperature of $MgCO_3$. This has the result of over baking of MgO which is subject to granular growth and sintering phenomena beyond its decomposition temperature, phenomena which reduces porosity and its reactivity towards water.

The traditional methods used for promoting hydration of the component MgO of calcined dolomites are the use of large excesses of water, of water at high temperature, or even of reactors working under pressure and at high temperatures. For these reasons, the totally hydrated dolomite, of general formula $xCaCO_3.yCa(OH)_2.zMg(OH)_2$ and containing non-hydrated CaO and/or MgO only in trace amounts (less than 1% by weight) or of a simplified formula $yCa(OH)_2.zMg(OH)_2$ still remains at the present time a specialty product.

There exists a comparable product, this time assimilated to a convenience product, i.e. semi-hydrated dolomite. This product may be described with a simplified formula of the $yCa(OH)_2.(z-n)Mg(OH)_2.nMgO$ type always with a molar y/z ratio comprised between 0.8 and 1.2, i.e. this is a dolomite for which the calcium component may generally be considered as having been totally hydrated, and the magnesium component only partly hydrated. This type of semi-hydrated dolomite is obtained by a very simple method resorting to conventional lime hydrators, very common in factories of lime-burners, and resorts to the same reaction mechanisms as those known in the case of slaking of quicklime.

The method according to the present invention is characterised in that it comprises the steps:
  a) calcination of a natural crude dolomite of formula $sCaCO_3.tMgCO_3$ with the obtaining of a calcined dolomite of general formula $xCaCO_3.yCaO.zMgO$, s, t, x, y and z being molar fractions under the conditions x+y=s and t=z and s/t comprised between 0.8 and 1.2,
  b) incomplete and controlled hydration for a predetermined period of time comprised between 5 minutes and 4 hours of said calcined dolomite of general formula $xCaCO_3.yCaO.zMgO$ by a predetermined amount of an aqueous phase, with formation of a mineral filler in the form of agglomerates of particle aggregates of general formula $aCaCO_3.bCa(OH)_2.cMg(OH)_2.dMgO.eCaO$, a, b, c, d and e being molar fractions with a=x, b+e=y, c+d=z and (a+b+e)/(c+d) being comprised between 0.8 and 1.2 and having values such that b represents the molar fraction corresponding to a weight proportion ≥15%, c represents the molar fraction corresponding to a weight proportion ≥1%, d represents the molar fraction corresponding to a weight proportion ≥1%, a and e respectively representing molar fractions corresponding to weight proportions ≥0%, said weight proportions being given based on the total weight of said semi-hydrated dolomite.

In an advantageous embodiment of the invention, the method further comprises grain size cut-off and/or milling of said agglomerates of particle aggregates to 150 μm, so as to only retain the grain size fraction of agglomerates of particle aggregates having a $d_{97}$<150 μm.

According to the properties of the natural dolomite source and to the operating conditions of the calcination and hydration of this dolomite, the semi-hydrated dolomite in a controlled way may have a variable hydration level of MgO into $Mg(OH)_2$, a variable grain size and chemical composition. Therefore it is by particularly controlling the hydration and calcination conditions that the method according to the invention gives the possibility of attaining a mineral filler in the form of agglomerates of particle aggregates as defined earlier, of general formula $aCaCO_3.bCa(OH)_2.cMg(OH)_2.dMgO.eCaO$, a, b, c, d and e being molar fractions with (a+b+e)/(c+d) being comprised between 0.8 and 1.2 and having values such that b represents the molar fraction corresponding to a weight proportion ≥15%, c represents the molar fraction corresponding to a weight proportion ≥1%, d represents the molar fraction corresponding to a weight proportion ≥1%, a and e respectively represent molar fractions corresponding to weight proportions ≥0%, said weight proportions being given based on the total weight of said semi-hydrated dolomite.

In a particular embodiment of the method according to the invention, said incomplete hydration is achieved via a dry route by adding to a unit mass of said calcined dolomite said predetermined amount of aqueous phase comprised between 0.2 and 0.8 unit masses, preferably from 0.4 and 0.6 unit mass. In this particular embodiment of the method according to the invention, the mineral filler of general formula $aCaCO_3.bCa(OH)_2.cMg(OH)_2.dMgO.eCaO$ is obtained as agglomerates of aggregates of particles and/or as aggregates of particles in a powdery form.

In an advantageous alternative according to the present invention, wherein said incomplete hydration is achieved via a wet route by adding to a unit mass of said calcined dolomite, said predetermined amount of aqueous phase comprised between 2 and 10 unit masses, preferably from 3 to 5 unit masses, more particularly 4 unit masses.

In this particular embodiment, said mineral filler of general formula $aCaCO_3.bCa(OH)_2.cMg(OH)_2.dMgO.eCaO$ as agglomerates of aggregates of particles and/or as of aggregates of particles is obtained as a suspension. In this case, the filler according to the invention may be obtained in powdery form by a subsequent separation and drying step, optionally followed by a grain size cut-off and/or milling.

In a particular embodiment of the method according to the invention, said incomplete hydration is achieved via a quasi-dry route by adding to a unit mass of said calcined dolomite said predetermined amount of aqueous phase comprised between 0.9 and 1.9 unit masses, preferably from 1.2 to 1.5 unit masses. In this particular embodiment of the method according to the invention, the mineral filler of general formula $aCaCO_3.bCa(OH)_2.cMg(OH)_2.dMgO.eCaO$ is obtained as agglomerates of aggregates of particles with strong humidity and/or as a slurry. In this case, the filler according to the invention may be obtained in a powdery form with a subsequent separation and drying step, optionally followed by a grain size cut-off and/or milling. In an alternative of the present invention, the aqueous phase is water.

The present invention also relates to a method for making a flame-retardant polymer composition according to the present invention which comprises a step for mixing said flame-retardant or flame-retarding mineral filler according to the invention with an organic polymer or a mixture of organic polymers. In this method, the flame-retardant polymer composition may be obtained with a method according to the invention, directly after producing the mineral filler according to the invention or later on, for example after acquiring the mineral filler through an intermediate who would have purchased it from requesters.

The conventional methods for incorporating mineral fillers in a polymer matrix may be used, for example mixing in a laboratory mixer or extruding with different types of equipment well known to one skilled in the art such as a single screw extruder, a twin screw extruder, a co-kneader (Buss), a mixer with an internal chamber or further a mixer with rollers.

Other embodiments of the method according to present invention are mentioned in the appended claims.

The present invention also relates to a use of a mineral filler as described above. More particularly, the present invention relates to a use of semi-hydrated dolomite fitting the formula $aCaCO_3.bCa(OH)_2.cMg(OH)_2.dMgO.eCaO$, a, b, c, d and e being molar fractions with (a+b+e)/(c+d) being comprised between 0.8 and 1.2 and having values such that b represents the molar fraction corresponding to a weight proportion ≥15%, c represents the molar fraction corresponding to a weight proportion ≥1%, d represents the molar fraction corresponding to a weight proportion ≥1%, a and e respectively represent molar fractions corresponding to weight proportions ≥0%, said weight proportions being given based on the total weight of said semi-hydrated dolomite, as a flame-retardant agent in a flame-retardant polymer composition.

These flame-retardant compositions comprising the flame retardant or flame-retarding mineral filler according to the invention therefore have, as mentioned above, a non-negligible advantage as compared with compositions based on ATH or MDH in that the combustion residue collected at the end of the combustion of the polymer is cohesive and may even be described as ceramised without resorting to complex formulations containing ATH or MDH as a flame-retardant filler, associated with nanoparticles or Zn borate as a ceramising agent. These ceramising agents are extensive, difficult to incorporate into the polymer and for a number of them have an unfavourable echotoxic profile which limits their use and makes it necessary to search for substitutes.

Preferably, in the use according to the invention, said flame-retardant polymer composition comprises an organic polymer, in particular a thermoplastic organic polymer.

In an alternative of the use according to the invention, said organic polymer is an apolar thermoplastic organic polymer, preferably of the polyethylene type, in an amount from 20 to 99%, advantageously from 40 to 60% by weight, preferably in an amount of about 50% by weight, based on the total weight of said flame-retardant polymer composition and in which said mineral filler is comprised between 1 and 80%, advantageously 40 and 60% by weight based on the total weight of said flame-retardant polymer composition.

In an another alternative of the use according to the invention, said organic polymer is a polar thermoplastic organic polymer, preferably of the polyolefin type, in particular of the ethylene-vinyl acetate (EVA) type, in an amount from 20 to 99%, advantageously from 25 to 60% by weight, based on the total weight of said flame-retardant polymer composition and in which said mineral filler is comprised between 1 and 80%, advantageously 40 and 75% by weight, based on the total weight of said flame-retardant polymer composition.

In an another embodiment of the use according to the invention, said organic polymer is a mixture of an apolar thermoplastic organic polymer, preferably of the polyethylene type and of a polar thermoplastic organic polymer, preferably of the polyolefin type, in particular of the ethylene-vinyl acetate type (EVA), the total proportion of these polymers being in an amount from 20 to 99%, advantageously from 25 to 60% by weight, based on the total weight of said flame-retardant polymer composition and in which said mineral filler is comprised between 1 and 80%, advantageously 40 and 75% by weight, based on the total weight of said flame-retardant polymer composition.

In the particular case of polymer matrices based on acetate, there is formation of acetic acid during the decomposition of the polymer. $Mg(OH)_2$ being soluble in acetic acid while MgO is not soluble therein, the semi-hydrated dolomite according to the invention has an advantage as compared with MDH alone or with a totally hydrated dolomite of simplified formula $yCa(OH)_2.zMg(OH)_2$ as described above. Indeed, when $Mg(OH)_2$ is solubilised, it loses its flame-retarding effect and mainly its barrier effect. This advantage of semi-hydrated dolomite more exactly of the presence in the filler of residual MgO, towards MDH and totally hydrated compounds of the type $yCa(OH)_2.zMg(OH)_2$ is all the more pronounced since the acetate proportion in the polymer matrix is high.

Another advantage of semi-hydrated dolomite as compared with totally hydrated dolomite or with MDH, related to the presence of MgO, is the fume suppressor effect (smoke suppressant). Indeed, MgO promotes oxidation of combustion gases, modifies the $CO/CO_2$ equilibrium and consequently leads to a reduced amount of released fumes.

It is understood that the mineral filler according to the invention may be used as a flame-retardant in combination with conventional fillers of the ATH or MDH type.

Other embodiments of the use according to the invention are mentioned in the appended claims.

Other features, details and advantages of the invention will become apparent from the description given hereafter, not as a limitation and referring to the examples and to the figures.

Figure 7:

As a comparison, FIG. 7 shows the combustion residue obtained at the end of the fire test with cone calorimetry of a composition similar to the one of Example 9 wherein the semi-hydrated dolomite no. 4 according to the invention was replaced by MDH (Magnifin H10), according to the prior art.

The present invention therefore relates to a flame-retardant or flame-retarding mineral filler comprising a calcium compound and a magnesium compound, through a flame-retarding polymer composition comprising this mineral filler, to respective methods for obtaining and using said mineral filler. The mineral filler according to the invention is in a powdery form and comprises a calcium compound and a magnesium compound, as a semi-hydrated dolomite, i.e. a single compound fitting the general formula $aCaCO_3.bCa(OH)_2.cMg(OH)_2.dMgO.eCaO$, a, b, c, d and e being molar fractions with $(a+b+e)/(c+d)$ being comprised between 0.8 and 1.2 and having values such that b represents the molar fraction corresponding to a weight proportion ≥15%, c represents the molar fraction corresponding to a weight proportion ≥1%, d represents the molar fraction corresponding to a weight proportion ≥1%, a and e respectively representing molar fractions corresponding to weight proportions ≥0%, said weight proportions being given based on the total weight of said semi-hydrated dolomite.

The size distribution of the mineral filler of the composition according to the invention is determined by laser grain size determination. For this measurement, 3 g of mineral filler are dispersed in 80 $cm^3$ of methanol with magnetic stirring and then a few drops of this suspension are sampled and introduced into the measurement cell of laser grain size measurement (Beckman Coulter LS 13 320 provided with a PIDS (Polarization Intensity Differential Scattering) device for measuring submicron elements). The elements for which the size is comprised between 0.04 and 2000 μm are measured. The results are expressed as percentiles noted as $d_x$, representing the diameter d in μm below which are found x % of the measured particles. We used $d_{97}$, $d_{90}$, $d_{50}$ and $d_3$.

In a first phase, the size distribution of the mineral filler according to the invention is directly measured after suspending the powder in methanol. This method therefore gives indications on the size of the agglomerates of aggregates of particles of the mineral filler of the composition according to the invention. With this measurement method, said agglomerates have a $d_{97}$ of <150 μm, preferably <100 μm, preferably <80 μm, preferably <50 μm; a $d_{90}$<30 μm, preferably <20 μm and preferably <15 μm or even 10 μm, a $d_{50}$<8 μm, preferably <5 μm, preferably <4 μm and a $d_3$>0.4 μm, preferably >0.5 μm.

A second method gave the possibility of further approaching the size of the individual particles and/or aggregates thereof by getting rid of the agglomeration problems. This time, the mineral powder suspension in methanol is subject to a de-agglomeration treatment with ultrasound before the laser grain size measurement. De-agglomeration is achieved by means of an ultrasonic probe Sonics VC750 with a power of 750 W for 1 min. This time, the $d_{97}$ of the particles or aggregates of particles of the mineral filler according to the invention is less than 30 μm, preferably than 20 μm, in particular than 15 μm and preferably than 10 μm, their $d_{90}$ is less than 15 μm, preferably than 10 μm, preferably than 7 μm and preferentially than 5 μm, their $d_{50}$ is less than 5 μm, preferably than 4 μm, and preferably than 3 μm, and their $d_3$ is greater than 0.3 μm, preferably 0.4 μm.

Fillers having such distribution properties in particle size may be obtained directly during the hydration reaction of dolomite, but advantageously they are obtained by grain size separation of semi-hydrated dolomite (sifting or separation in air), or even by milling the semi-hydrated dolomites (air jet milling for example).

The present mineral filler therefore comprises agglomerates of aggregates of particles for which the size is essentially comprised between the values of $d_3$ and $d_{97}$, i.e. between 0.4 and 150 μm, preferably between 0.5 and 100 μm, preferably between 0.5 and 80 μm and more preferentially between 0.5 and 50 μm.

EXAMPLES

Example 1

The use as a flame retardant-filler of a semi-hydrated dolomite no. 1 obtained industrially by calcination and hydration (slaking) of natural dolomite via a dry route in a standard industrial hydrator. The dolomite from the hydrator is then separated with different separation steps in air in order to obtain a first grain size grade, noted as grade A. The properties of this semi-hydrated dolomite no. 1 of grade A are grouped in Table 1.

This filler is incorporated in an amount of 60% by mass in an ethylene and vinyl acetate copolymer matrix containing 28% of vinyl acetate (EVA, Escorene UL328, produced by ExxonMobil Chemical). The mixing between the polymer matrix and the mineral filler is carried out by means of a twin screw extruder. Filled polymer samples with a measured size of $100 \times 100 \times 4$ mm$^3$ are then prepared from this mixture by means of an injection press. These samples are subject to mechanical tests (elongation at break and impact resistance) and fire tests by a cone calorimeter. The results are compared with those obtained for the non-filled host polymer and for the same polymer, filled under the same conditions and with the same proportions of ATH (Albemarle Martinal OL 107 LEO) and of MDH (Albemarle Magnifin H10). The mechanical strength results are shown in Table 2. The results of the fire tests with a cone calorimeter are illustrated in FIG. 1.

Generally, the addition of mineral fillers in a polymer matrix significantly weakens the mechanical properties of the latter (reduction in the elongation at break and of resilience).

As regards the chemical strength (Table 2) of EVA filled with 60% of the relevant filler in this example (semi-hydrated dolomite no. 1 grade A), if the elongation at break is smaller than the one measured in the case of EVA filled with fillers of reference ATH and MDH, the resilience is on the other hand comparable. As the elongation break is greater than 40%, this EVA composition according to the invention remains suitable for use in most contemplated applications (notably for the manufacturing of certain cables).

Figure 1:
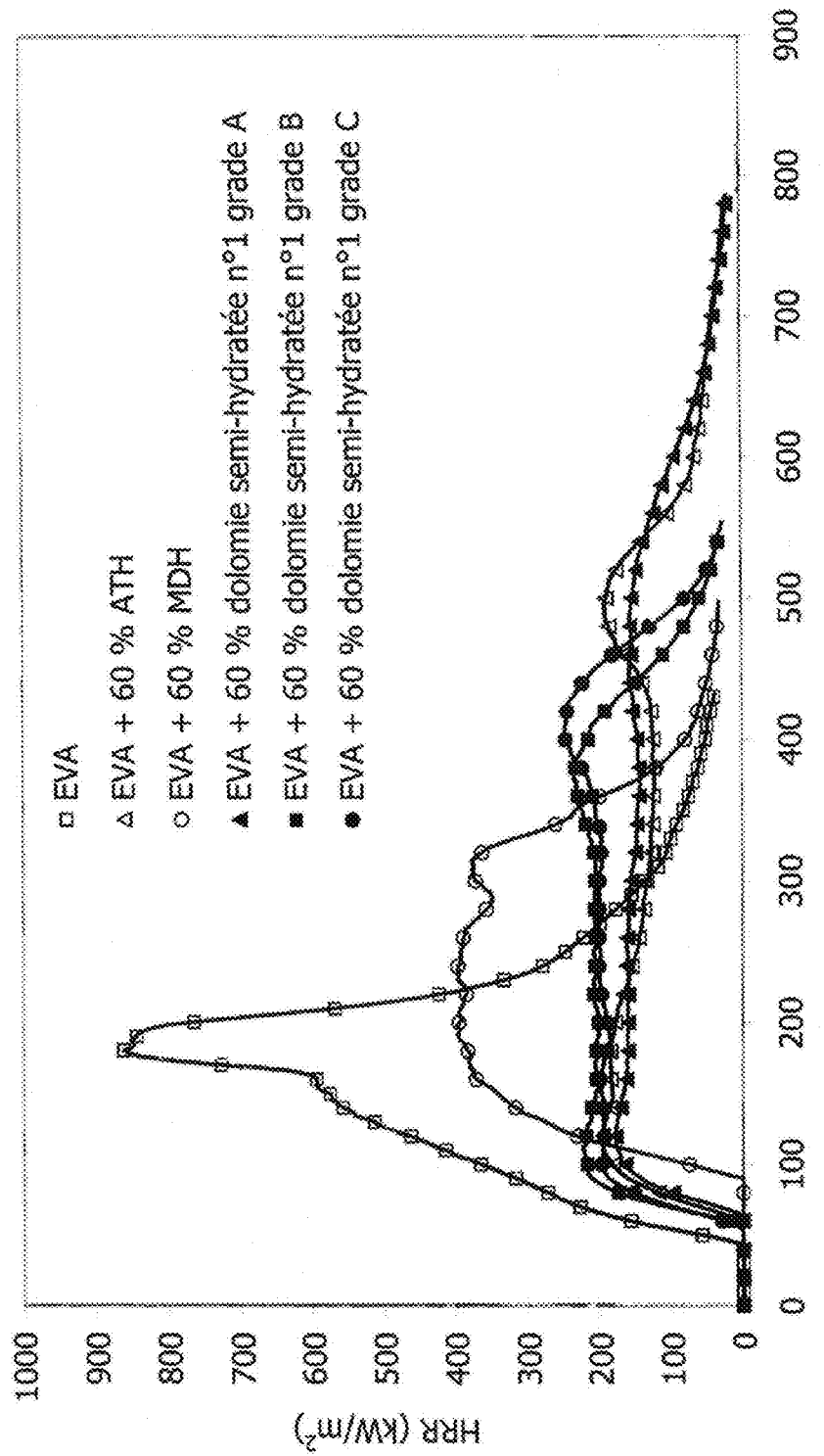
FIG. 1 is a graph illustrating the results of the fire tests with a cone calorimeter of Examples 1 to 3.

As for the flame-retarding effect, FIG. 1 clearly shows that the incorporation of 60% of the filler according to the invention into the EVA matrix clearly reduces the released energy during combustion of the polymer (the maximum of the HRR curve is clearly smaller as compared with unfilled EVA). This decrease is comparable with the one measured for the EVA composition containing ATH. Moreover it is more pronounced than the one measured for the EVA composition containing MDH. On the other hand, heat release is spread out in time which gives the possibility of avoiding hot points which are at the origin of propagation of the fire from one room to the other.

As explained above, the advantage of the filler according to the invention as compared with MDH would come from the presence of non-hydrated MgO in the mineral filler of the composition according to the invention. In the case of semi-hydrated dolomite, if the Mg(OH)$_2$ fraction is affected by acetic acid, the MgO fraction, not soluble in acetic acid, remains efficient, notably for forming a protective charring layer.

Finally, the starting of combustion (ignition time) is delayed as compared with the non-filled polymer and the observed delay is comparable with the one obtained with the EVA composition containing ATH.

Example 2

The use as a flame retardant filler, of a dolomite of the same origin as the one used in Example 1 (semi-hydrated dolomite no. 1), but this time, the grain size of the dolomite from the hydrator was controlled by different separation steps in air in order to obtain a second grain size grade, noted as grade B, finer than the grade A of Example 1. The properties of this semi-hydrated dolomite no. 1 of grade B are also grouped in Table 1.

As in example 1, this filler is incorporated into EVA, in the same proportions and with the same experimental conditions. The mechanical strength results are shown in Table 2 below. The results of the fire tests are illustrated in FIG. 1.

Table 2 indicates that by reducing the size of the particles as compared with grade A described in Example 1, it is possible to improve the mechanical strength of the composition (increase of both elongation at break and of resilience). Moreover, if elongation at break for this Example 2, remains less than the one measured for compositions based on ATH and MDH, the resilience is on the other hand higher for the filler according to this Example 2 than for the compositions containing these fillers of reference ATH and MDH.

As for the flame-retarding effect (FIG. 1), the curve illustrating the release of heat during combustion of the composition versus time remains clearly less than that of non-filled EVA or containing MDH. On the other hand, this time it is slightly higher than the one corresponding to the composition containing ATH or to the composition of Example 1. This difference is probably due to the larger reactivity of Mg(OH)$_2$ of the semi-hydrated dolomite of grade B as compared with that of grade A because of the greater fineness of the Mg(OH)$_2$ particles. The Mg(OH)$_2$ is then more easily degraded with acetic acid released during the combustion of EVA. However, the retarding effect of the filler of the present example is satisfactory.

Figure 2A:
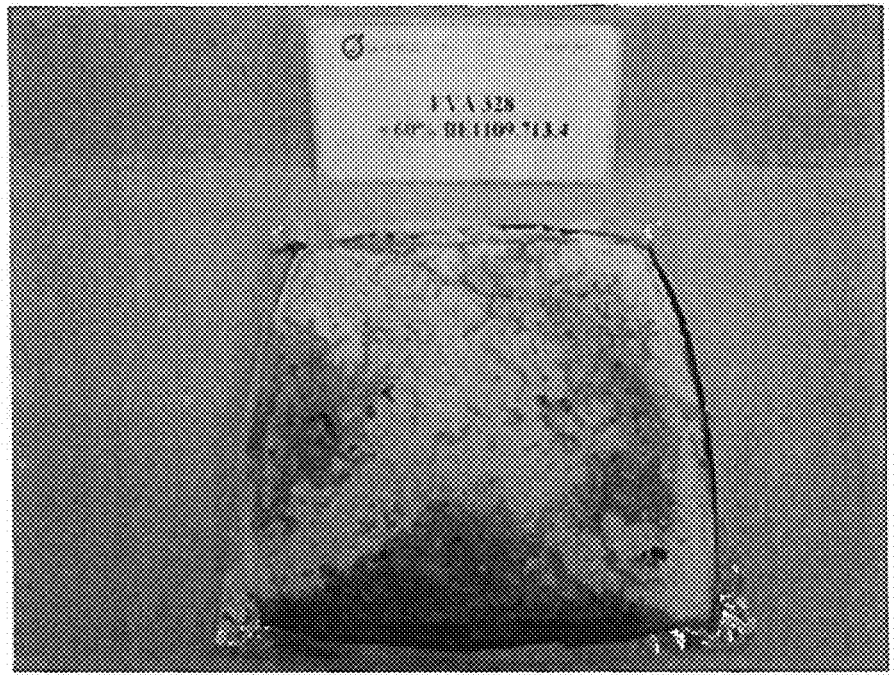
FIGS. 2A and 2B show the combustion residue obtained at the end of the fire test with cone calorimetry for the composition of Example 2.
Figure 2B:
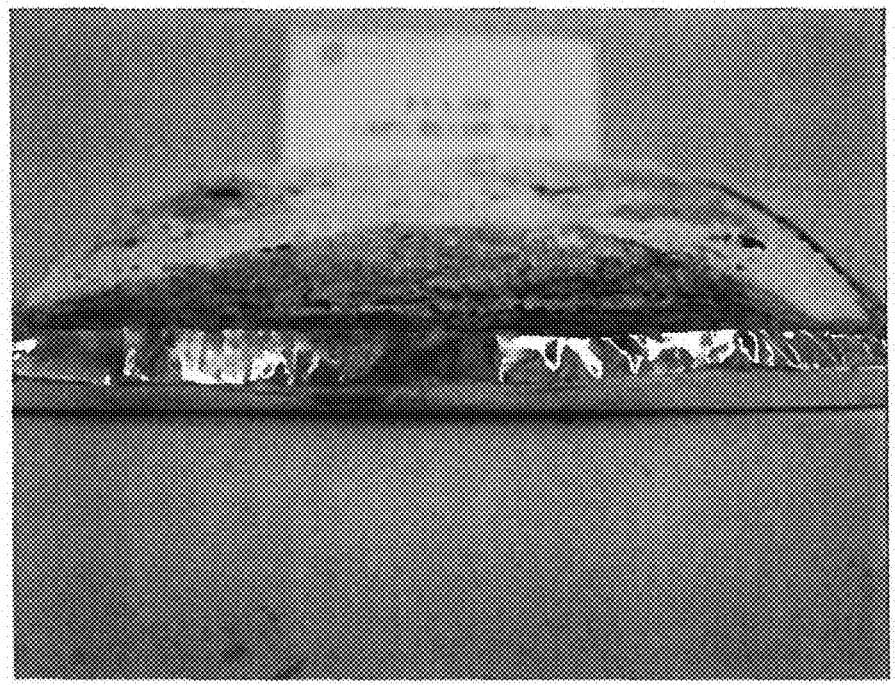

By observing the combustion residues obtained at the end of the cone calorimeter test, shown in FIGS. 2A and 2B, it is possible to state that at the end of its combustion, the composition of this example led to the formation of a residue which is cohesive as compared with the residues obtained for compositions based on the same EVA and on MDH or ATH, the residues of which are similar to a powder or to an ash. The residue actually appears as a single and non-cracked layer, not even at the surface which globally has the same shape as the sample before combustion, however, in spite of swelling which occurred during the combustion of the composition. This residue exhibits some solidity, in particular a high compressive mechanical resistance (of the order of 200 kPa) during a crushing test not described here.

Example 3

The use as a flame retardant filler, of a dolomite of the same origin as the one used in Examples 1 and 2 (semi-hydrated dolomite no. 1), but this time, the dolomite from the hydrator is then separated by separation in air in order to cut the grain size curve of the agglomerates at 80 μm, and then the fraction <80 μm thereby obtained is milled in an air jet milling machine in order to obtain a third grain size grade, noted as grade C, even finer than grade B described in Example 2. The properties of this semi-hydrated dolomite no. 1 of grade C are grouped in Table 1.

As an Example 1, this filler is incorporated in the EVA, in the same proportions and with the same experimental conditions. The mechanical strength results are shown in Table 2 below. The results of the tests of the flame-retarding effect, are illustrated in FIG. 1. These results are similar to those obtained for the composition of Example 2.

Example 4

The mineral filler used in the composition of this example is the same as the one described in Example 2.

This time, this filler is incorporated in an amount of 50% by weight into a medium density polyethylene matrix (MDPE 3802, a grade for cables produced by Total) by using a mixer of the Brabender type. Plates, prepared with a hydraulic press, with a measured size of 100×100×4 mm³ were then tested with fire (cone calorimetry) and specimens cut out from plates with a thickness of 3 mm were subject to mechanical tests (elongation at break and impact resistance). The results obtained for the composition according to the invention are compared with the results obtained for the non-filled host polymer and for the same filled polymer under the same conditions and with the same proportions of ATH and of MDH. The mechanical strength results are shown in Table 2. The results of the fire tests with a cone calorimeter are shown in FIG. 3.

Figure 3:
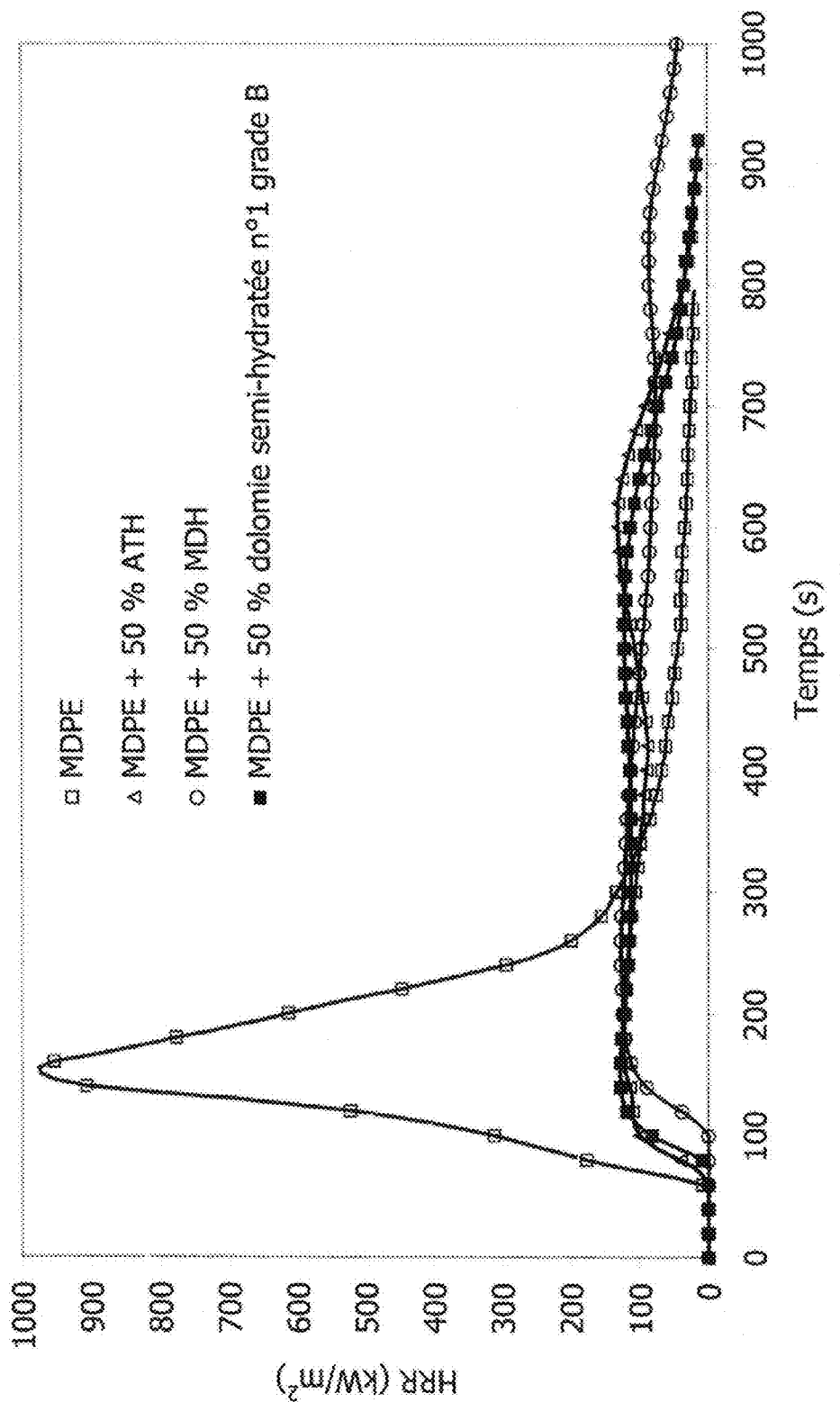
FIG. 3 is a graph illustrating the results of fire tests with a cone calorimeter of Example 4.

The use of semi-hydrated dolomite in MDPE very clearly reduces the heat evolvement during the combustion as compared with non-filled MDPE (FIG. 3). Both the mechanical results and the flame-retardant effect measured with this composition according to the invention are similar to those measured for the composition of MDPE and ATH. The evolved heat (HRR) with the composition of this example according to the invention is similar to that of the MDPE and MDH composition. This heat evolvement is very spread out in time and the combustion is retarded as compared with the non-filled polymer.

Example 5

The composition of this example is similar to that of example 4 (MDPE filled with 50% of semi-hydrated dolomite no. 1 of grade B), except that the mineral filler is treated at the surface with 4% of calcium stearate before being incorporated into the polymer matrix.

This surface treatment is carried out by introducing with stirring in a mixer of the Lodiger M20 type heated beforehand to 60° C., 2 kg of a mixture of semi-hydrated dolomite no. 1 of grade B and of solid calcium stearate as a powder (4% based on the mass of dolomite). The temperature was then raised to 200° C. (about 17 minutes are needed for passing from 60 to 200° C.). When the latter is stabilised, the mixture remains for 10 minutes at this temperature with stirring before being cooled and taken out of the mixer.

The mechanical results corresponding to this composition are grouped in Table 2. The surface treatment of the semi-hydrated dolomite no. 1 of grade B with 4% calcium stearate allows improvement in the mechanical properties of the MDPE composition.

Example 6

Use as flame-retardant filler, of a semi-hydrated dolomite no. 2 obtained industrially by calcination and hydration of natural dolomite. This natural dolomite stems from another deposit than the natural dolomite used in Examples 1 to 5 for obtaining the semi-hydrated dolomite no. 1 of grade A, B and C. On the other hand, the calcination and hydration methods giving the possibility of passing from natural dolomite to semi-hydrated dolomite are comparable. Again, hydration is achieved via a dry route in a standard hydrator. The grain size of the dolomite from the hydrator is then controlled with different separation steps in air in order to obtain a grain size grade suitable for the use of this semi-hydrated dolomite as a flame-retardant filler. The main properties of this semi-hydrated dolomite no. 2 are repeated in Table 3.

In a similar way to the ones described in Examples 1 to 3, this filler is incorporated in an amount of 60% by mass into the EVA matrix. This sample is subject to the fire test (cone calorimetry). The results obtained for the composition according to the invention are compared in FIG. 4 with the results obtained for the non-filled host polymer and for the same filled polymer under the same conditions and with the same proportions of ATH and MDH. The use of the semi-hydrated dolomite no. 2 in EVA (FIG. 4) very clearly reduces the heat evolvement during combustion as compared with non-filled EVA.

Example 7

Use as a flame-retardant filler, of a semi-hydrated dolomite no. 3 obtained by hydration in the laboratory of a baked dolomite from calcination under standard conditions in an industrial oven. Natural dolomite, from which are obtained the baked dolomite and then the semi-hydrated dolomite no. 3, stems from the same deposit as the natural dolomite used for producing the semi-hydrated dolomite no. 1 of grade A, B or C used in Examples 1 to 5. The oven used for the calcination of this dolomite is also identical, but this time, unlike the Examples 1 to 5, the hydration is no longer produced industrially in a hydrator via a standard dry route, but via a wet route in the laboratory by adding 200 g of baked dolomite in 670 g of demineralised water at 40° C. with stirring in an isotherm container and by continuing the hydration reaction until the temperature of the suspension stabilises at 55° C. (to within ±0.5° C.). At the end of the hydration, the semi-hydrated dolomite is filtered on a Buchner and then dried for one night at 150° C. before being crudely de-agglomerated and then finally milled. The main properties of the semi-hydrated dolomite no. 3 are found in Table 3.

Figure 4:
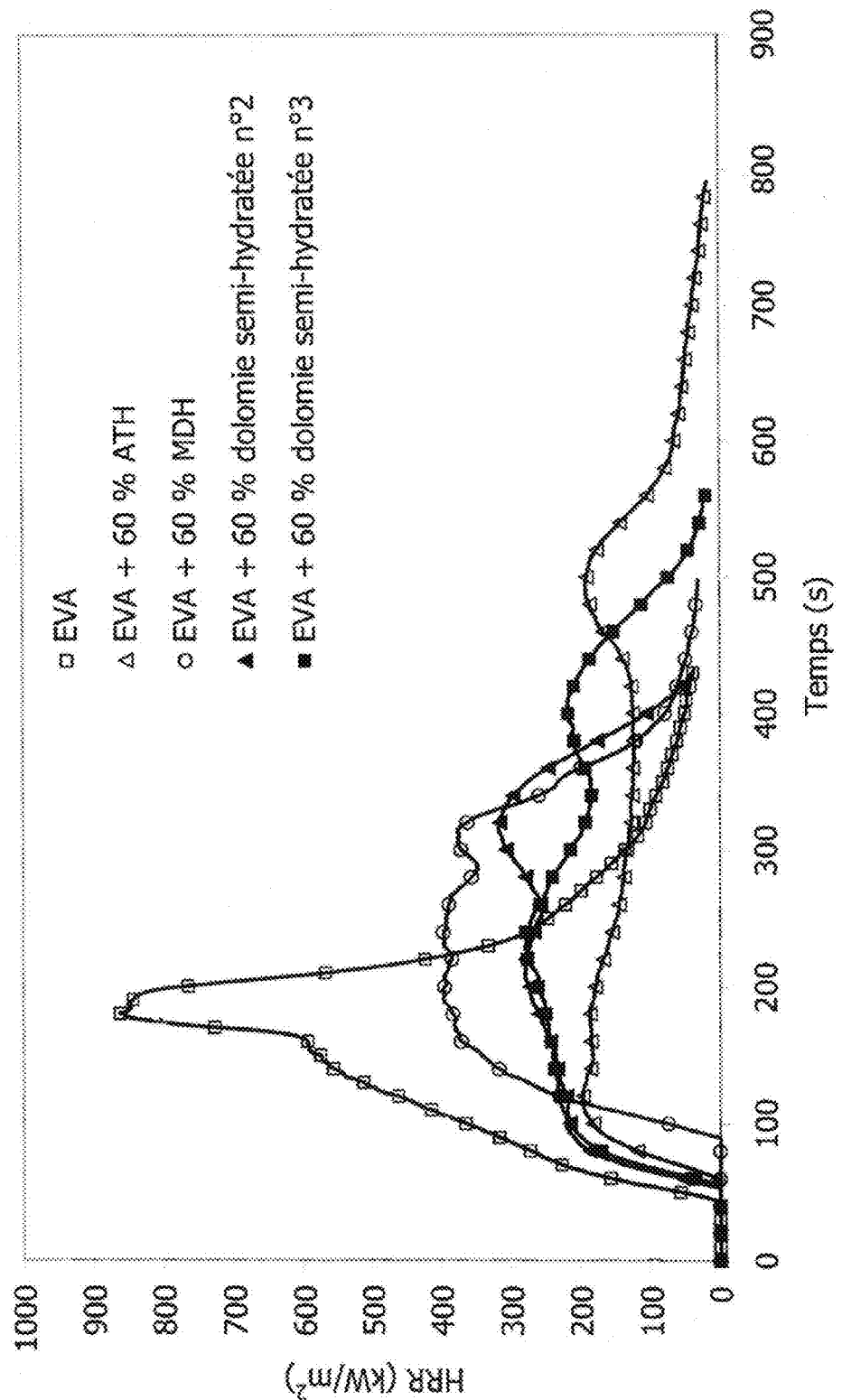
FIG. 4 is a graph illustrating the results of fire tests with cone calorimetry of Examples 6 and 7.

This semi-hydrated dolomite no. 3 is then incorporated into the EVA matrix according to the operating procedure described in Example 1. The flame-retarding effect of this composition is illustrated in FIG. 4.

The use of the semi-hydrated dolomite no. 3 in EVA (FIG. 4) very clearly reduces the heat evolvement during combustion as compared with non-filled EVA.

Example 8

LOI

Specimens corresponding to the compositions of Examples 1 and 2 (EVA+60% by weight of dolomite no. 1 of grade A and of grade B respectively) were prepared and then cut with a stamping press to the shape required for measuring LOI. The LOI was measured according to the ASTM D2863 standard and the obtained values are shown in Table 4.

As the oxygen level is 21% in the atmosphere, this result shows that the reference polymer, which has an LOI of 21% is "combustible". On the other hand, the formulation according to the invention has an LOI greater than 21% and therefore becomes "self-extinguishing".

Example 9

Use of a semi-hydrated dolomite no. 4, during the preparation at a pilot scale of a flame-retardant polymer composition.

The semi-hydrated dolomite used as a filler in this example is an industrial product comparable with the semi-hydrated dolomite of grade B used in the composition of Example 2 and described in Table 1. Nevertheless, for this example, a clearly greater amount of this dolomite (about 800 kg) was sampled on the production site, and its grain size was controlled by a separation step in air in order to obtain a fine grain size grade equivalent to the grade B of Example 2. The main characteristics of this dolomite, averaged over several samplings, are given in Table 5.

This semi-hydrated dolomite no. 4 was incorporated in an amount of 60% by mass in a polymer composition described in Table 6. The different polymers (Exact 8293, Alcudia PA440, Fusabond E226 and Antioxydant AO25) were in a first phase mixed in suitable proportions with the formulation of Table 6. This polymer mixture was then placed in a metering hopper. The semi-hydrated dolomite no. 4, as for it, was introduced into a second metering hopper. Both of these hoppers were connected to the inputs of a co-kneader (Buss type) equipped with a screw with a diameter of 47 mm and having a length/diameter ratio of the screw of 11. The production rate was set to 15 kg/h. The average temperature over the length of the co-kneader is of the order of about 160° C., higher or lower in the different supply/mixing/transport areas which follow each other over the length of the screw. At the output of the co-kneader, the product arrives in a single screw which transports it as far as a die, at which the material is pushed through six holes each with a diameter of about 3 mm. A knife continuously rotates near these holes for cutting threads with a diameter of 3 mm into cylindrical granules with a diameter of 3 mm and a height of approximately 3 mm. The extrusion/granulation area is continuously cooled with water. The granules are then separated from the coolant water and then dried for about 1 h at 50° C.

In a second phase, the thereby prepared granules were extruded in order to form a strip with a width of about 10 cm on a thickness of 2 mm by means of a single screw extruder at 160° C.

Five specimens were cut out in this strip in order to conduct measurements of elongation at break. The average of these five measurements is of the order of 170% and is to be compared with an elongation of the order of 350% for the same formulation extruded under exactly similar conditions, but in which the mineral filler is MDH Magnifin H10 from Albemarle as a replacement for the semi-hydrated dolomite no. 4.

Figure 5:
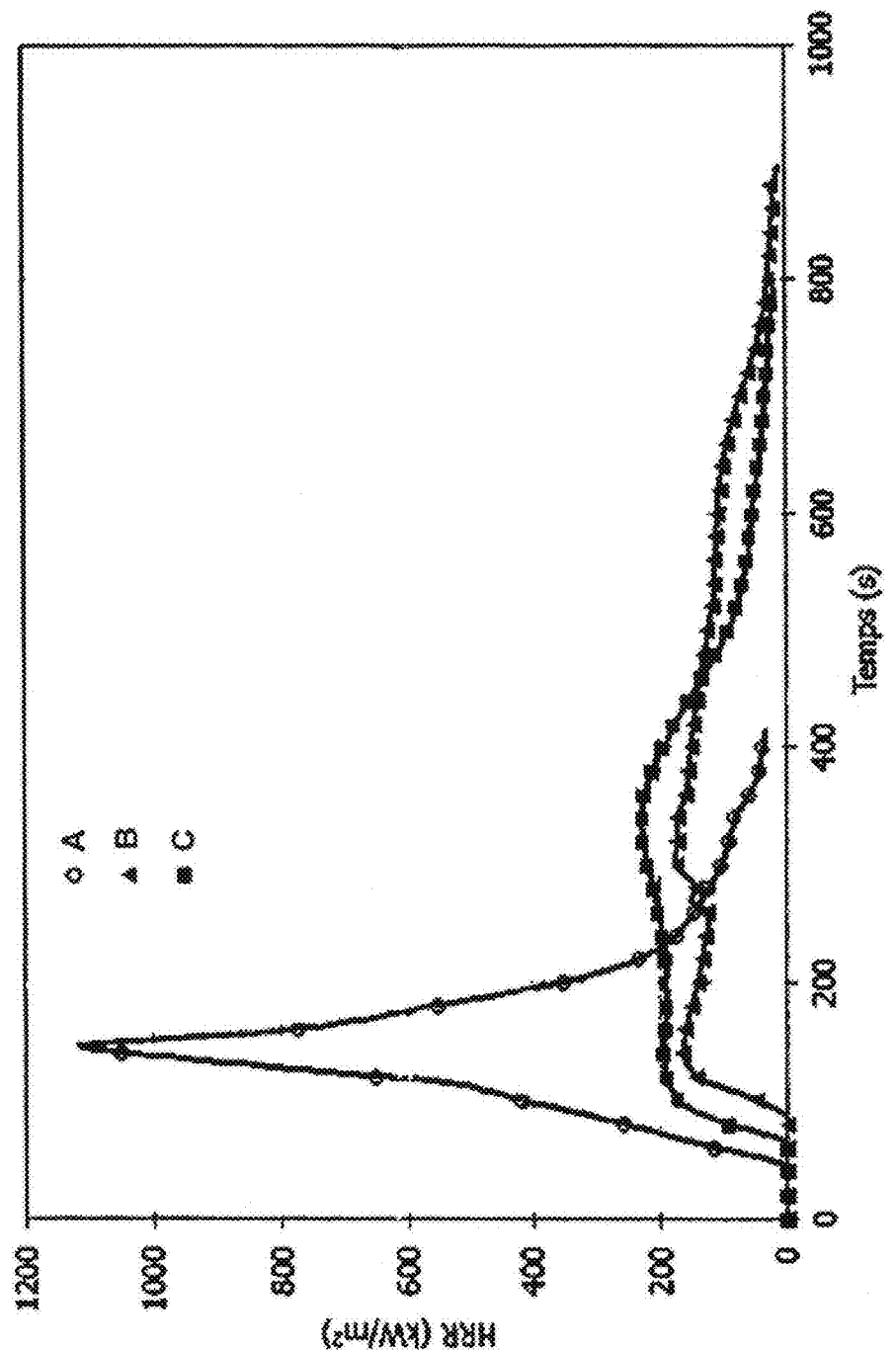
FIG. 5 is a graph illustrating the results of fire tests with cone calorimetry of Example 9.

Fire tests by cone calorimetry were conducted on the granules. The results of these tests are illustrated in FIG. 5 (curve C) where they are compared with the results of the cone calorimetry tests of the same non-filled polymer composition (curve A) and of an identical composition filled with 60% by mass of MDH (Magnifin H10) (curve B). These curves confirm once again the very clear flame-retarding effect of the semi-hydrated dolomite, an effect quasi similar to that of MDH (according to the maximum of the HRR curve) in spite of a shorter ignition time than the one observed for the composition based on MDH (according to the prior art).

Figure 6:
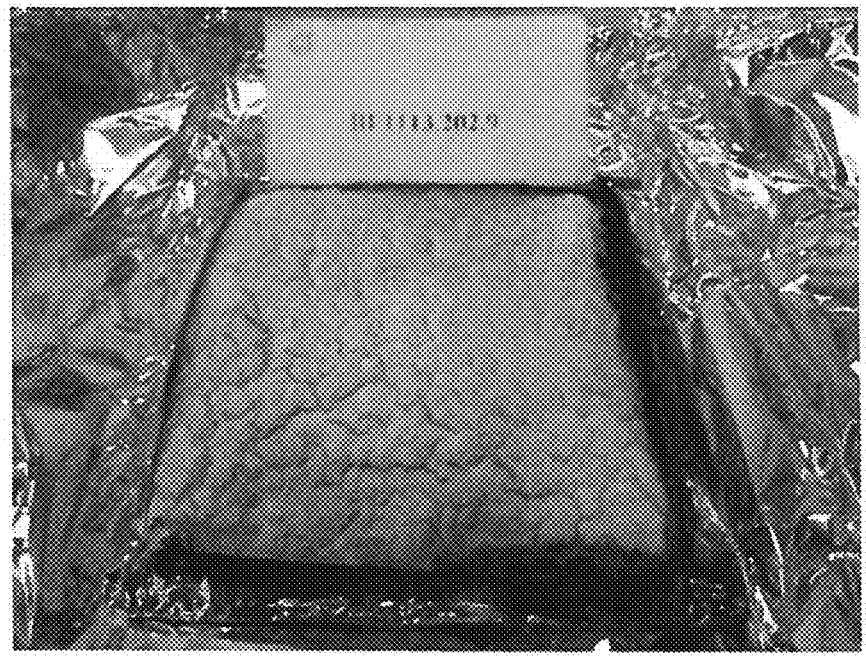
FIG. 6 shows the combustion residue obtained at the end of the fire test by cone calorimetry for the composition of Example 9.

The results obtained at the end of these cone calorimetry tests are shown in FIGS. 6 and 7 for the compositions based on semi-hydrated dolomite no. 4 and based on MDH, respectively. FIG. 6, like FIGS. 2A and 2B, illustrate the formation of a cohesive residue and swollen at the end of the combustion of the composition filled with semi-hydrated dolomite. On the contrary, the combustion residue of the composition based on MDH according to the prior art (FIG. 7) is not cohesive and breaks into pieces. The residue obtained from the composition based on semi-hydrated dolomite is also clearly whiter than that obtained in the case of the composition with MDH.

TABLE 1

| | Semi-hydrated dolomite no. 1 grade A (Example 1) | | Semi-hydrated dolomite no. 1 grade B (Example 2, 4 and 5) | | Semi-hydrated dolomite no. 1 grade C (Example 3) | |
|---|---|---|---|---|---|---|
| | Mass % | Number of moles | Mass % | Number of moles | Mass % | Number of moles |
| $CaCO_3$ | 5.7 | a = 0.057 | 4.8 | a = 0.48 | 15.1 | a = 0.151 |
| $Ca(OH)_2$ | 52.5 | b = 0.708 | 55.3 | b = 0.747 | 47.6 | b = 0.642 |
| $Mg(OH)_2$ | 10.9 | c = 0.186 | 11.1 | c = 0.190 | 16.1 | c = 0.277 |
| MgO | 24.9 | d = 0.618 | 24.6 | d = 0.610 | 18.8 | d = 0.467 |
| CaO | 3.4 | e = 0.061 | 1.6 | e = 0.032 | 0.0 | e = 0.000 |
| Ca/Mg (mol) | | 1.03 | | 1.03 | | 1.07 |
| Sum of impurities[1] | 2.19 ± 0.15 | | 2.45 ± 0.15 | | 1.50 ± 0.15 | |
| $Fe_2O_3$ | 0.56 ± 0.05 | | 0.45 ± 0.05 | | 0.41 ± 0.05 | |
| Humidity 150° C. | 0.50 ± 0.02 | | 0.80 ± 0.02 | | 1.50 ± 0.02 | |
| BET surface area ($m^2$/g) | 10.0 | | 11.3 | | 11.0 | |
| Grain size 1[2] | | | | | | |
| $d_3$ (μm) | 0.6 | | 0.6 | | 0.7 | |
| $d_{10}$ (μm) | 1.2 | | 1.1 | | 1.0 | |
| $d_{50}$ (μm) | 4.7 | | 3.2 | | 2.4 | |
| $d_{90}$ (μm) | 13.0 | | 7.4 | | 6.2 | |
| $d_{97}$ (μm) | 36.2 | | 9.8 | | 30.1 | |
| $d_{100}$ (μm) | 92.1 | | 76.4 | | 69.6 | |
| Grain size 2[3] | | | | | | |
| $d_3$ (μm) | 0.5 | | 0.5 | | 0.5 | |
| $d_{10}$ (μm) | 1.0 | | 0.9 | | 0.8 | |
| $d_{50}$ (μm) | 3.2 | | 2.7 | | 1.7 | |
| $d_{90}$ (μm) | 7.4 | | 6.2 | | 3.5 | |
| $d_{97}$ (μm) | 9.4 | | 7.4 | | 4.7 | |
| $d_{100}$ (μm) | 15.7 | | 11.8 | | 8.2 | |
| $Mg(OH)_2$ decomposition T (° C.) | 250-420° C. | | 250-420° C. | | 250-400° C. | |
| $Ca(OH)_2$ decomposition T (° C.) | 420-600° C. | | 420-600° C. | | 400-540° C. | |
| 95% T (° C.) | 440° C. | | 443° C. | | 380° C. | |

[1] $MgO + SiO_2 + Al_2O_3 + Fe_2O_3 + MnO + P_2O_5 + K_2O + SO_3$
[2] measurement of the size of the agglomerates by laser grain size determination on non-deagglomerated powder
[3] measurement of the size of the aggregates by laser grain size determination on powder deagglomerated with ultrasound

TABLE 2

| Example | Polymer matrix | Mineral filler | Mass % of mineral filler in the composition | Elongation at break (%) Value | Elongation at break (%) Error (±) | Resilience (kJ/m²) Value | Resilience (kJ/m²) Error (±) |
|---|---|---|---|---|---|---|---|
| | EVA | — | — | 300 | 35 | 6 | 1 |
| | EVA | ATH Martinal OL 107 LEO | 60 | 113 | 20 | 20 | 1 |
| | EVA | MDH Magnifin H10 | 60 | 167 | 24 | 24 | 3 |
| 1 | EVA | Semi-hydrated dolomite no. 1 grade A | 60 | 44 | 3 | 24 | 2 |
| 2 | EVA | Semi-hydrated dolomite no. 1 grade B | 60 | 62 | 4 | 28 | 2 |
| 3 | EVA | Semi-hydrated dolomite no. 1 grade C | 60 | 61 | 6 | 28 | 2 |
| | MDPE | | | 716 | 14 | 61 | 4 |
| | MDPE | ATH Martinal OL 107 LEO | 50 | 7 | 2 | 2 | 1 |
| | MDPE | MDH Magnifin H10 | 50 | 12 | 9 | 10 | 1 |
| 4 | MDPE | Semi-hydrated dolomite no. 1 grade B | 50 | 6 | 1 | 4 | 1 |
| 5 | MDPE | Semi-hydrated dolomite no. 1 grade B treated with 4% Ca stearate | 50 | 14 | 3 | 4 | 1 |

TABLE 3

| | Semi-hydrated dolomite no. 2 (Example 6) | | Semi-hydrated dolomite no. 3 (Example 7) | |
|---|---|---|---|---|
| | Mass % | Number of moles | Mass % | Number of moles |
| $CaCO_3$ | 10.1 | 0.101 | 6.0 | 0.060 |
| $Ca(OH)_2$ | 51.5 | 0.695 | 41.6 | 0.575 |
| $Mg(OH)_2$ | 3.2 | 0.055 | 3.9 | 0.067 |
| MgO | 27.5 | 0.682 | 29.4 | 0.730 |
| CaO | 1.0 | 0.018 | 13.1 | 0.233 |
| Ca/Mg (mol) | | 1.10 | | 1.09 |
| Sum impurities[1] | 2.24 | | 4.92 | |
| $Fe_2O_3$ | 0.83 | | 1.09 | |
| Humidity 150° C. | 0.73 | | 0.50 | |
| BET surface area (m²/g) | 10.7 | | 10.3 | |
| Grain size 1[2] | | | | |
| $d_3$ (µm) | 0.7 | | 0.6 | |
| $d_{10}$ (µm) | 1.0 | | 1.0 | |
| $d_{50}$ (µm) | 2.2 | | 2.9 | |
| $d_{90}$ (µm) | 5.6 | | 9.8 | |
| $d_{97}$ (µm) | 7.4 | | 30.1 | |
| $d_{100}$ (µm) | 13.0 | | 83.9 | |
| Grain size 2[3] | | | | |
| $d_3$ (µm) | 0.5 | | 0.5 | |
| $d_{10}$ (µm) | 0.7 | | 0.9 | |
| $d_{50}$ (µm) | 1.8 | | 2.4 | |
| $d_{90}$ (µm) | 5.6 | | 6.8 | |
| $d_{97}$ (µm) | 7.4 | | 8.9 | |
| $d_{100}$ (µm) | 14.3 | | 15.7 | |
| $Mg(OH)_2$ decomposition T (° C.) | 250-400 | | 250-400 | |
| $Ca(OH)_2$ decomposition T (° C.) | 400-600 | | 400-600 | |
| 95% T (° C.) | 455 | | 488 | |

[1] $MgO + SiO_2 + Al_2O_3 + Fe_2O_3 + MnO + P_2O_5 + K_2O + SO_3$
[2] measurement of the size of the agglomerates by laser grain size determination on non-deagglomerated powder
[3] measurement of the size of the aggregates by laser grain size determination on powder deagglomerated with ultrasound

TABLE 4

| Material | LOI |
|---|---|
| EVA | 21 |
| Composition of Example 1 (EVA + 60% of dolomite no. 1 of grade A) | 25 |
| Composition of Example 1 (EVA + 60% of dolomite no. 1 of grade B) | 24 |

TABLE 5

| | Semi-hydrated dolomite no. 4 (Example 9) | |
|---|---|---|
| | Mass % | Number of moles |
| $CaCO_3$ | 7.6 | 0.076 |
| $Ca(OH)_2$ | 53.1 | 0.717 |
| $Mg(OH)_2$ | 9.5 | 0.163 |
| MgO | 25.5 | 0.623 |
| CaO | 2.5 | 0.048 |
| Ca/Mg (mol) | | 1.07 |
| Sum impurities[1] | 1.8 | |
| $Fe_2O_3$ | 0.4 | |
| Humidity 150° C. | 1.2 | |
| Grain size 1[2] | | |
| $d_3$ (µm) | 0.7 | |
| $d_{10}$ (µm) | 1.2 | |
| $d_{50}$ (µm) | 4.4 | |
| $d_{90}$ (µm) | 9.2 | |
| $d_{97}$ (µm) | 11.2 | |
| $d_{100}$ (µm) | 17.2 | |
| Grain size 2[3] | | |
| $d_3$ (µm) | 0.7 | |
| $d_{10}$ (µm) | 1.0 | |
| $d_{50}$ (µm) | 3.6 | |
| $d_{90}$ (µm) | 7.7 | |
| $d_{97}$ (µm) | 9.3 | |
| $d_{100}$ (µm) | 14.3 | |
| $Mg(OH)_2$ decomposition T (° C.) | 250-420 | |
| $Ca(OH)_2$ decomposition T (° C.) | 420-600 | |
| 95% T (° C.) | 452 | |

[1] $MgO + SiO_2 + Al_2O_3 + Fe_2O_3 + MnO + P_2O_5 + K_2O + SO_3$
[2] measurement of the size of the agglomerates by laser grain size determination on non-deagglomerated powder
[3] measurement of the size of the aggregates by laser grain size determination on powder deagglomerated with ultrasound

TABLE 6

| Products | Mass proportions In the composition |
|---|---|
| Ethylene and octane copolymer (Exact 8203, Borealis) | 17.7 |
| EVA (Alcudia PA440, Repsol) | 15.0 |
| Polyethylene grafted with maleic anhydride (Fusabond E226, Du Pont) | |
| Antioxidant (AO 25, Shulman) | 3.3 |
| Semi-hydrated dolomite no. 4 | 60.0 |

It is understood that the present invention is by no means limited to the embodiments described above and that many modifications may be made thereto without departing from the scope of the appended claims.

The invention claimed is:

1. A powdery mineral filler comprising a calcium compound and a magnesium compound, characterized in that said mineral filler comprises a semi-hydrated dolomite fitting the general formula $aCaCO_3.bCa(OH)_2.cMg(OH)_2.dMgO.eCaO$, a, b, c, d and e being molar fractions with $(a+b+e)/(c+d)$ being comprised between 0.8 and 1.2 and having values such that b represents the molar fraction corresponding to a weight proportion $\geq 15\%$, c represents the molar fraction corresponding to a weight proportion $\geq 1\%$, d represents the molar fraction corresponding to a weight proportion $\geq 1\%$, a and e respectively representing molar fractions corresponding to weight proportions being both $\geq 0\%$, said weight proportions being given based on the total weight of said semi-hydrated dolomite and in that said mineral filler comprises agglomerates of aggregates of particles, said aggregates of particles having a $d_{97}<30$ μm, a $d_{90}<15$ μm, a $d_{50}<5$ μm, and a $d_3>0.3$ μm, after suspension in methanol.

2. The mineral filler according to claim 1, wherein said agglomerates of aggregates of particles have a $d_{97}<150$ μm, a $d_{90}$ of $<30$ μm, a $d_{50}<8$ μm, and a $d_3>0.4$ μm, measured after suspension in methanol.

3. The mineral filler according to claim 1, wherein the molar fractions are such that $(a+b+e)/(c+d)$ is comprised in the range from 0.90 to 1.15.

4. The mineral filler according to claim 1, comprising from 1 to 20% by weight of $CaCO_3$ based on the total weight of said semi-hydrated dolomite.

5. The mineral filler according to claim 1, comprising less than 15% by weight of CaO based on the total weight of said semi-hydrated dolomite.

6. The mineral filler according to claim 1, comprising more than 5% by weight of MgO based on the total weight of said semi-hydrated dolomite and comprising less than 41% by weight of MgO based on the total weight of said semi-hydrated dolomite.

7. The mineral filler according to claim 1, comprising from 2 to 51% by weight of $Mg(OH)_2$ based on the total weight of said semi-hydrated dolomite.

8. The mineral filler according to claim 1, comprising from 15 to 69% by weight of $Ca(OH)_2$ based on the total weight of said semi-hydrated dolomitepres.

9. The mineral filler according to claim 1, having a specific surface area measured by nitrogen adsorption manometry and computed according to the BET method comprised between 6 and 35 $m^2/g$.

10. A flame-retardant polymer composition comprising a flame-retardant or flame-retarding mineral filler according to claim 1 and a polymer, said mineral filler being incorporated in an amount from 1 to 80% by weight into the flame-retardant polymer composition.

11. The flame-retardant polymer composition according to claim 10, further comprising a surface agent or a coupling agent such as a silane or a fatty acid for surface treatment of said mineral filler.

12. The flame-retardant polymer composition according to claim 10, wherein the maximum of an HRR curve of said organic polymer is reduced by 50 to 65%.

13. The flame retardant polymer composition according to claim 11, wherein said polymer is a thermoplastic organic polymer.

14. A method for manufacturing a mineral filler according to claim 1, comprising the steps of
calcination of a natural crude dolomite with formula $sCaCO_3.tMgCO_3$ with the obtaining of a calcined dolomite of general formula $xCaCO_3.yCaO.zMgO$, s, t, x, y and z being molar fractions under the conditions $x+y=s$ and $t=z$ and $s/t$ comprised between 0.8 and 1.2,
incomplete and controlled hydration for a predetermined period of time comprised between 5 minutes and 4 hours of said calcined dolomite of general formula $xCaCO_3.yCaO.zMgO$ by a predetermined amount of an aqueous phase, with formation of a mineral filler in the form of agglomerates of particle aggregates of general formula $aCaCO_3.bCa(OH)_2.cMg(OH)_2.dMgO.eCaO$, a, b, c, d and e being molar fractions with $a=x$, $b+e=y$, $c+d=z$ and $(a+b+e)/(c+d)$ being comprised between 0.8 and 1.2 and having values such that b represents the molar fraction corresponding to a weight proportion $\geq 15\%$, c represents the molar fraction corresponding to a weight proportion $\geq 1\%$, d represents the molar fraction corresponding to a weight proportion $\geq 1\%$, a and e respectively representing molar fractions corresponding to weight proportions $\geq 0\%$, said weight proportions being given based on the total weight of said semi-hydrated dolomite, said aggregates having a $d_{97}<30$ μm, $d_{90}<15$ μm, a $d_{50}<5$ μm, and a $d_3>0.3$ μm, said incomplete hydration being achieved via a dry route by adding to a unit mass of said calcined dolomite, said predetermined amount of aqueous phase comprised between 0.2 and 0.8 unit masses.

15. The manufacturing method according to claim 14, further comprising a grain size cutoff and/or milling of said agglomerates of particles to 150 μm, so as to only retain the grain size fraction of the agglomerates of aggregates of particles having a $d_{97}<150$ μm.

16. The method for manufacturing a flame retardant polymer composition according to claim 10, comprising a step for mixing said mineral filler with an organic polymer.

17. A method for manufacturing a mineral filter according to claim 1, comprising the steps of
calcination of a natural crude dolomite with formula $sCaCO_3.tMgCO_3$ with the obtaining of a calcined dolomite of general formula $xCaCO_3.yCaO.sMgO$, s, t, x, y and z being molar fractions under the conditions $x+y=s$ and $t=z$ and $s/t$ comprised between 0.8 and 1.2,
incomplete and controlled hydration for a predetermined period of time comprised between 5 minutes and 4 hours of said calcined dolomite of general formula $xCaCO_3.yCaO.zMgO$ by a predetermined amount of an aqueous phase, with formation of a mineral filler in the form of agglomerates of particle aggregates of general formula $aCaCO_3.bCa(OH)_2.cMg(OH)_2.dMgO.eCaO$, a, b, c, d and e being molar fractions with $a=x$, $b+e=y$, $c+d=z$ and $(a+b+e)/(c+d)$ being comprised between 0.8 and 1.2 and having values such that b represents the molar fraction corresponding to a weight proportion $>15\%$, c represents the molar fraction corresponding to a weight proportion >1%, d represents the molar fraction corresponding to a weight proportion >1%, and e respectively representing molar fractions corresponding to weight proportion ≥0%, said weight proportions being given based on the total weight of said semi-hydrated dolomite, said aggregates having a $d_{90}$<30 µm, $d_{90}$<15 µm, a $d_{50}$<5 µm and a $d_3$>0.3 µm, said incomplete hydration being achieved via a quasi-dry route by adding to a unit mass of said calcined dolomite, said predetermined amount of aqueous phase comprised between 0.9 and 1.9 unit masses.

18. The manufacturing method according to claim 17, further comprising a grain size cutoff and/or milling of said agglomerates of particles to 150 µm, so as to only retain the grain size fraction of the agglomerates of aggregates of particles having a $d_{97}$<150 µm.

19. A method for manufacturing a mineral filter according to claim 1, comprising the steps of calcination of a natural crude dolomite with formula $sCaCO_3.tMgCO_3$ with the obtaining of a calcined dolomite of general formula $xCaCO_3.yCaO.sMgO$, s, t, x, y and z being molar fractions under the conditions x+y=s and t=z and s/t comprised between 0.8 and 1.2, incomplete and controlled hydration for a predetermined period of time comprised between 5 minutes and 4 hours of said calcined dolomite of general formula $xCaCO_3.yCaO.zMgO$ by a predetermined amount of an aqueous phase, with formation of a mineral filler in the form of agglomerates of particle aggregates of general formula $aCaCO_3.bCa(OH)_2.cMg(OH)_2.dMgO.eCaO$, a, b, c, d and e being molar fractions with a=x, b+e=y, c+d=z and (a+b+e)/(c+d) being comprised between 0.8 and 1.2 and having values such that b represents the molar fraction corresponding to a weight proportion ≥15%, c represents the molar fraction corresponding to a weight proportion >1%, d represents the molar fraction corresponding to a weight proportion >1%, and e respectively representing molar fractions corresponding to weight proportion >0%, said weight proportions being given based on the total weight of said semi-hydrated dolomite, said aggregates having a $d_{97}$<30 µm, $d_{90}$<15 µm, a $d_{50}$<5 µm and a $d_3$>0.3 µm, said incomplete hydration being achieved via a wet route, by adding to a unit mass of said calcined dolomite said predetermined amount of aqueous phase comprised between 1.1 and 6 unit masses.

20. The manufacturing method according to claim 19, further comprising a grain size cutoff and/or milling of said agglomerates of particles to 150 µm, so as to only retain the grain size fraction of the agglomerates of aggregates of particles having a $d_{97}$<150 µm.

21. Method for manufacturing a flame-retardant product, comprising the steps of:

mixing a mineral filler comprising a semi-hydrated dolomite fitting the general formula $aCaCO_3.bCa(OH)_2.cMg(OH)_2.dMgO.eCaO$, a, b, c, d and e being molar fractions with (a+b+e)/c+d) being comprised between 0.8 and 1.2 and having values such that b represents the molar fraction corresponding to a weight proportion >15%, c represents the molar fraction corresponding to a weight proportion >1%, d represents the molar fraction corresponding to a weight proportion >1%, a and e respectively representing molar fractions corresponding to weight proportions being both ≥0%, said weight proportions being given based on the total weight of said semi-hydrated dolomite, said mineral filter comprising agglomerates of aggregates of particles, said aggregates of particles having a $d_{97}$<30 µm, $d_{90}$<15 µm, a $d_{50}$<5 µm and a $d_3$>0.3 µm, with an organic polymer, in order to produce a flame-retardant polymer composition, and forming said flame-retardant polymer composition into a flame-retardant product as plate, thread, strip, sheats or granules.

22. Method for manufacturing a flame-retardant product according to claim 21, wherein said step of forming comprises a pressing, an extrusion, a passage into a die, a cutting or a granulation.

* * * * *